(No Model.) 3 Sheets—Sheet 1.
C. A. SPRING, D. SPRINGER, H. T. SPRING & R. STEEL.
HEATER FOR RAILROAD CARS, &c.
No. 464,322. Patented Dec. 1, 1891.
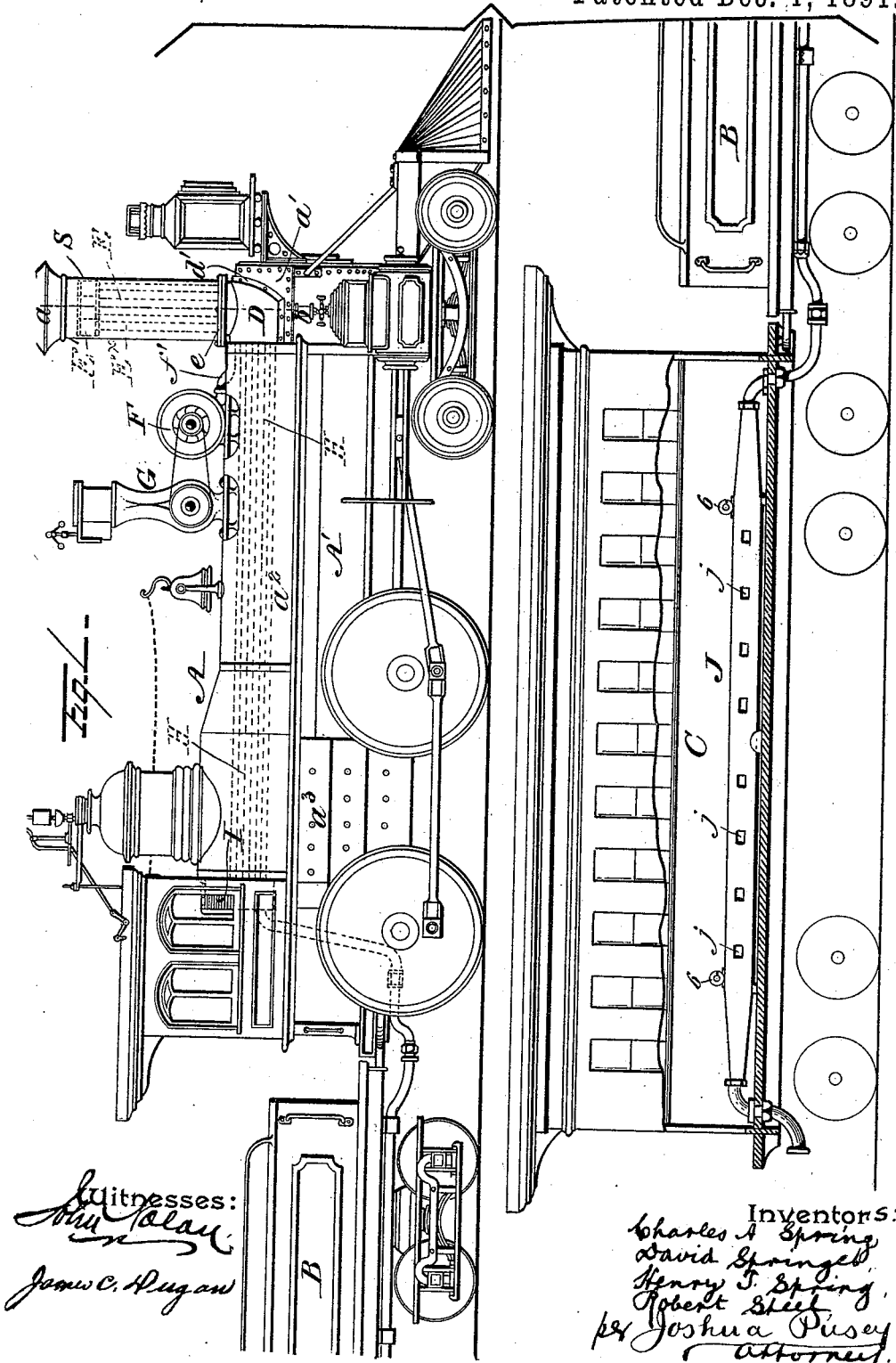
Witnesses:
Inventors:
Charles A. Spring
David Springer
Henry T. Spring
Robert Steel
per Joshua Pusey
Attorney

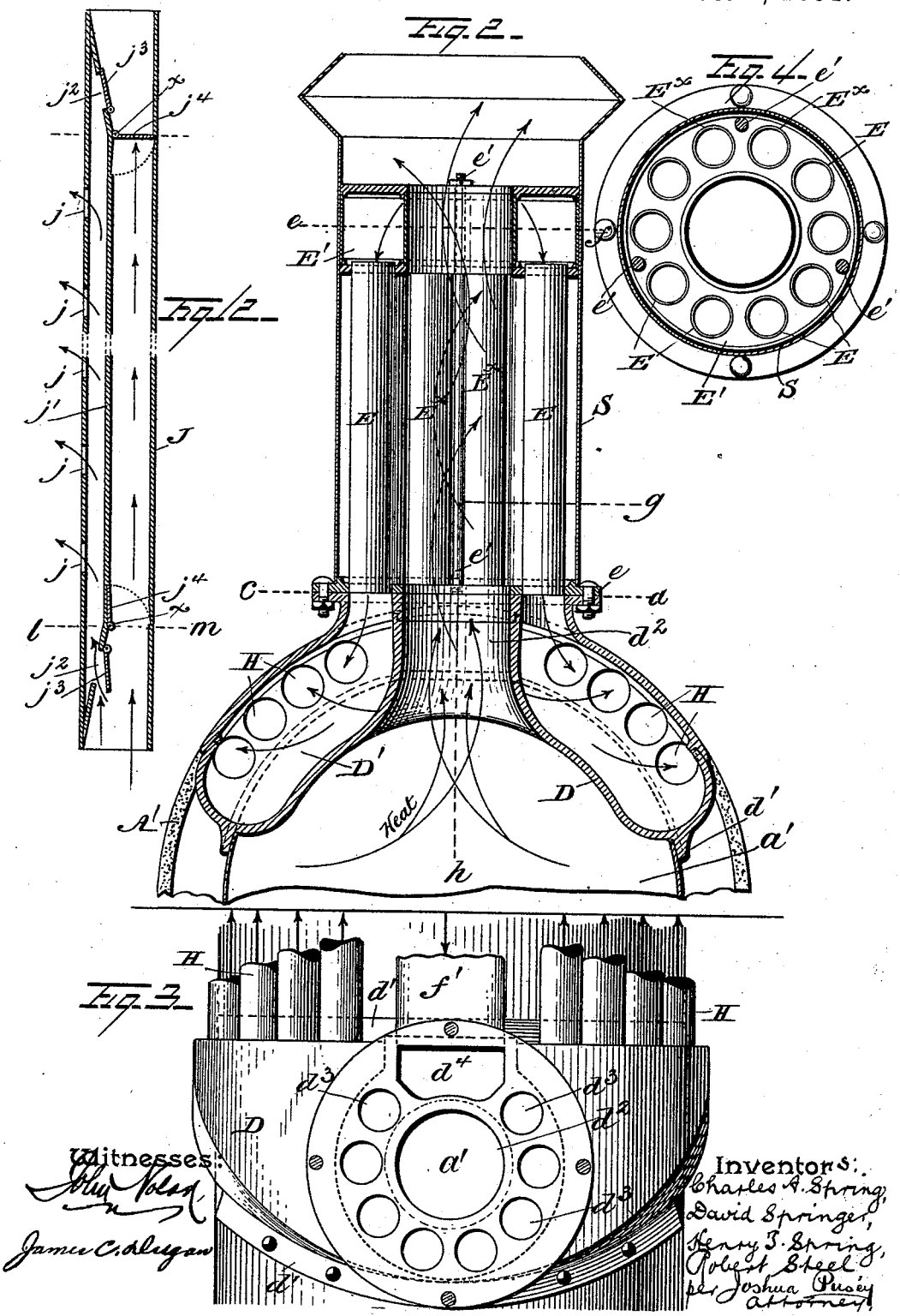

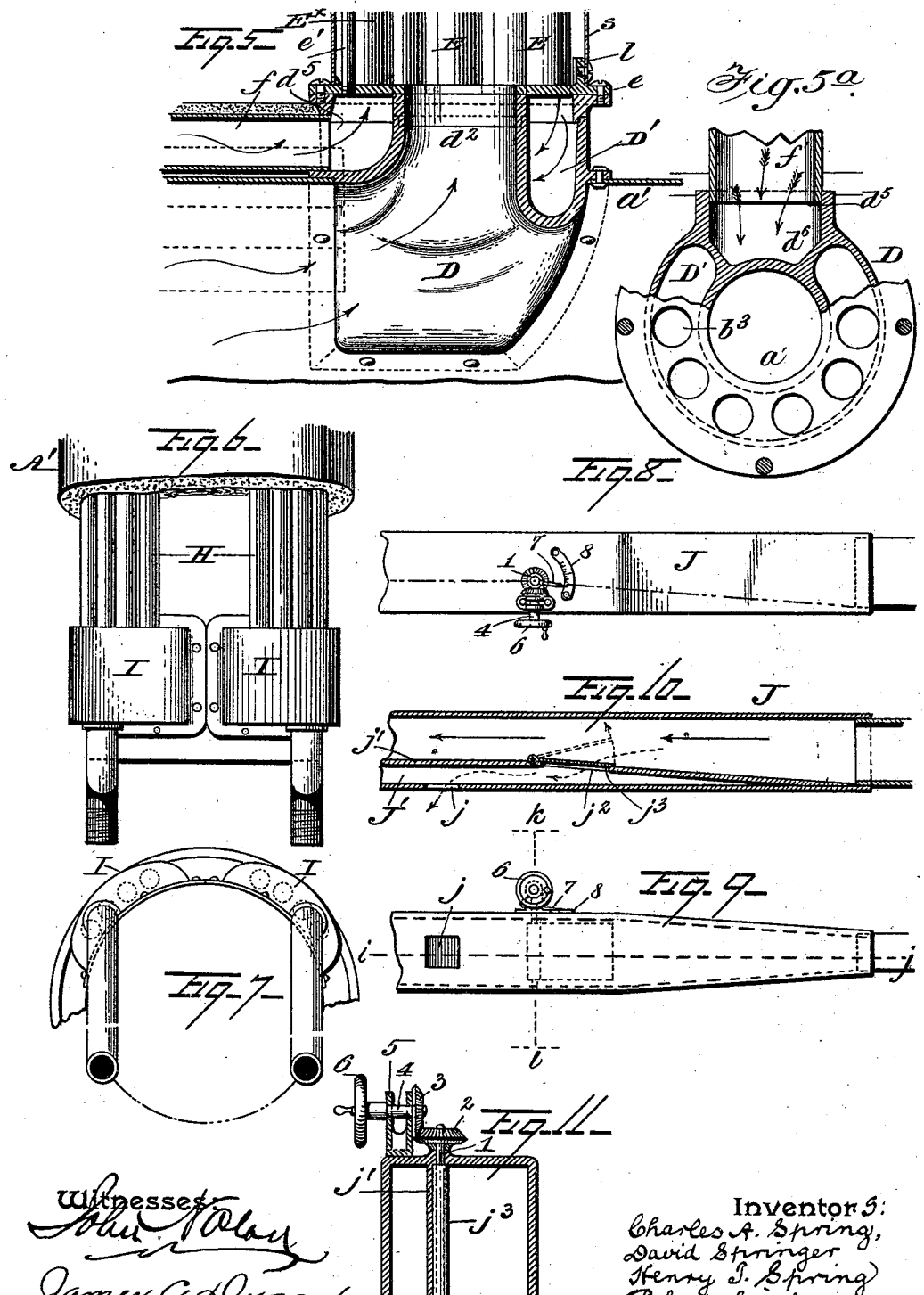

UNITED STATES PATENT OFFICE.

CHARLES A. SPRING, DAVID SPRINGER, AND HENRY T. SPRING, OF ROYER'S FORD, AND ROBERT STEEL, OF PHILADELPHIA, PENNSYLVANIA.

HEATER FOR RAILROAD-CARS, &c.

SPECIFICATION forming part of Letters Patent No. 464,322, dated December 1, 1891.

Application filed December 28, 1889. Serial No. 335,196. (No model.)

*To all whom it may concern:*

Be it known that we, CHARLES A. SPRING, DAVID SPRINGER, and HENRY T. SPRING, all residing at Royer's Ford, in the county of Montgomery and State of Pennsylvania, and ROBERT STEEL, residing at the city and county of Philadelphia, in said State, all citizens of the United States, have invented certain new and useful Improvements in Heaters for Railroad-Cars, &c., of which the following is a full, clear, and exact description, reference being had to the accompanying drawings, of which—

Figure 1, Sheet 1, is a side elevation of a locomotive, tender, and car (the latter partly in section) equipped with our improvements, parts unnecessary to the understanding of the invention being omitted. Fig. 2, Sheet 2, is a transverse vertical section through the smoke-stack and adjuncts, as on the line $a\,b$, Fig. 1. Fig. 3 is a transverse horizontal section as on the line $c\,d$, Fig. 2. Fig. 4 is a similar section as on the line $e\,f$, Fig. 2, parts appearing in Fig. 3 being omitted. Fig. 5 is a vertical section as on the line $g\,h$, Fig. 2. Fig. $5^a$ is a detail of the saddle, showing the conduit or passage $d^6$, which connects the fan discharge-pipe with the vertical feed-pipes $E^x$. Fig. 6 is a sectional plan view of the rear end of the locomotive, showing the boxes into which the heated air is delivered before its passage to and through the distributing-pipes. Fig. 7 is an end view of Fig. 6. Fig. 8 is a plan of one end of one of the air-conducting flues. Fig. 9 is a side view thereof. Fig. 10 is a horizontal section as on the line $i\,j$, Fig. 9. Fig. 11 is a cross-section as on the line $k\,l$, Fig. 9, or on the line $l\,m$, Fig. 12, Sheet 2. Fig. 12 is a horizontal section through the flue, showing the main air-passage as provided with end-closing valves.

This invention relates to certain improvements in that general class of air heating and distributing devices wherein air is injected into and heated within a pipe or series of pipes and conducted therefrom to a suitable point or points of discharge.

The improvements are particularly though not exclusively designed for use in connection with the railroad-car-heating system illustrated in Letters Patent No. 404,316, granted May 28, 1889, to David Springer and Charles A. Spring, in which system air is injected into a series of pipes arranged within the locomotive smoke-stack and the incoming air heated by the escaping products of combustion from the furnace, the air thus heated being conducted through suitable pipes or conduits to the interior of the car or cars comprising the train.

The nature, construction, and operation of the improvements will be hereinafter fully described, and the particular matter claimed as new will be duly defined.

Referring to the annexed drawings, A, Fig. 1, represents a locomotive, B its tender, and C a passenger-car, the whole being coupled in the usual manner.

$a'$ is the smoke-box, $a^2$ the boiler, and $a^3$ the furnace structure of the locomotive.

In the top of the smoke-box $a'$, at or about the point where the smoke-stack passage is ordinarily formed, we cut a transversely-elongated opening, within which we fit a saddle-shaped box D. The latter is provided with a suitable supporting-flange $d'$, which rests upon and is firmly fixed to the cylindrical casing of the smoke-box. Passing centrally through the "saddle" D, as we term it, is a passage or conduit $d^2$, Figs. 2, 3, and 5, which is about equal in diameter to that of the smoke-stacks in vogue. Surrounding the top of this conduit is a flanged boss, which is provided with a concentric series of vertical holes $d^3$, Fig. 3, which open into the chamber D', formed within the saddle. Toward the rear side of said boss is an elongated opening $d^4$, which communicates with an aperture $d^5$ in the adjacent side of the saddle by way of an intermediate conduit or passage $d^6$, formed in the latter. (See Figs. 3, 5, and $5^a$.) Bolted upon this boss is a ring $e$, which is provided with a series of holes that coincide with those in the boss. Extending vertically from these holes is a series of pipes E $E^x$, whose upper ends open into a closed annular box or chamber E', Figs. 1, 2, and 4, which is suitably supported and braced by means of tie-bolts $e'$ or other devices. Two of the pipes $E^x$ or more, if required, communicate with the elongated opening $d^4$ in the forward side of the saddle, and to this opening is directed, by way of the conduit or passage $d^6$, the discharge pipe or nozzle $f'$ of a fan (or air-pump) F, Fig. 1, which is mounted upon a suitable part of the locomotive, as shown. This fan or pump is adapted to be driven by means of a small "donkey-engine," as G, or other motor; but it may, however, be driven directly or indirectly by the locomotive itself. We prefer to use the small independent engine, as thereby the fan may be run while the train is at rest. Surrounding the chamber or box E' and the pipes E E$^×$ is the smoke-stack S, which is screwed or otherwise firmly secured to a lug or lugs $l$, Fig. 5, on the ring $e$. Extending from the rear side of the saddle-chamber D' are two series of pipes H, which lie longitudinally along the exterior surface of the boiler and are covered and concealed by the jacket A'. These two series of pipes lead, respectively, into lateral chambers I, Figs. 1, 6, and 7, on the rearward end of the boiler or furnace, and said chambers in turn communicate by means of suitable tubes or conductors with longitudinal flues J, disposed along the inner sides of the cars to be heated. The connecting-tubes at the adjacent ends of the cars are flexible and are detachably coupled by means of ordinary hose-couplings.

The flues J are usually square in cross-section, their ends are tapered and provided with nozzles to which the coupling-pipes are connected, and their inner sides or walls are furnished with registers or discharge-openings $j$. Extending longitudinally through each flue is a vertical partition $j'$, whose ends are inclined or set inward, and provided with openings $j^2$ with doors or valves $j^3$, which latter are so mounted as to be capable of being swung to or fro in order to open or close the supplemental or discharge chamber J' within the flue. As a means whereby these valves may be conveniently operated when desired, we extend their pivot-pins 1 up through the top of the flue, and provide each of the same with a small bevel-gear 2, with which engages a similar gear 3, whose shaft 4 is mounted within a suitable bracket 5, and equipped with a hand-wheel 6. Pin 1 is also provided with an index 7, which turns upon a graduated segment 8, fixed upon the top of the flue. (See Figs. 8 to 11, both inclusive.)

The operation is as follows: Upon motion being imparted to the fan or air-pump, air is injected thereby through the pipes E$^×$ into the chamber E', thence down the series of pipes E into the saddle-chamber D', thence through the double series of pipes H into the chambers I, thence through the pipe-connections into the flues located within the passenger-cars. Whereupon the air, which is at this stage in a highly-heated state, may be discharged into the car or cars through the openings $j$ in the flues, or it may be conducted through the latter from car to car and finally allowed to escape at the rear of the train, if necessary. In the former case the valve on the leading end of the flue would be opened by the proper turning of the hand-wheel 6, whose shaft, as hereinbefore stated, is geared with the valve-stem, and the quantity of air emitted from the flue would be nicely determined by the position upon the segment 8 of the index or pointer on said stem. As the ends of the longitudinal partition $j'$ within the flue, as also the end valves, are laterally inclined with respect to the air-passages, as shown, the progress through the flue of the volume of heated air will not be retarded when the valve is open or closed. Two of these valves are provided in order that the air may be admitted to the chamber J' while the car is running either way.

The bottom of the saddle D is preferably, though not essentially, sunk down below the opening $e^2$ in the smoke-box, and constitutes in effect a crown-plate. The escaping products of combustion from the furnace and the exhaust-steam from the engine-cylinder come in contact with this plate and impart a high degree of heat thereto. They thereupon pass through the central conduit in the saddle, then envelop the pipes confined within the smoke-stack, and finally pass off through the central opening in the upper chamber E'. The parts are thus highly heated, and as the incoming air rushes through the same and through the saddle-chamber it will take up a considerable portion of the heat, and when such air has completed its passage through the double series of pipes arranged upon the boiler and entered the end chambers I it—the air—will be most effectually heated.

In Fig. 12 we have shown the main air-passage of the flue provided near each end thereof with a valve $j^3$, pivoted at $x$, which valve may be swung to or from the partition in order to open or close said passage. This valve is furnished with suitable exterior means for manipulating the same—such, for example, as the gearing and hand-wheel devices clearly illustrated in Fig. 11. By the use of the valves $j^3$ the air may, if desired, be prevented from escaping from the end of the flue, in order that the same may be wholly utilized within the car or cars. In a long train of cars, in which this is particularly desirable, the valve on the rear end of the flue within the last car would be closed, and the forward valve thereof, as also the valves $j^3$ on the flues within the other cars, would be opened. If, however, it be required to permit the escape of surplus air, (as from a short train of cars,) all the valves $j^3$ would be opened.

The flue is provided at each end thereof with one of these valves $j^3$, in order that the volume of air may be retained, as above described, when the car is running either way. Said valves may close from the partition outward, as shown in Fig. 12, or from the side of the flue inward, as convenience may require.

Having thus described our invention, we claim as new and wish to secure by Letters Patent—

1. The combination, with the smoke-stack or escape-pipe of a furnace structure, of the inclosed heating-chamber disposed at the entrance to said stack or pipe, the supplemental heating-chamber arranged within said stack or escape-pipe, the series of pipes communicating with said inclosed and supplemental chambers, the feed pipe or pipes communicating with the supplemental chamber, and the distributing pipe or pipes communicating with the said inclosed chamber, substantially as described.

2. The combination, with the furnace structure, the boiler, the smoke-box, and the smoke-stack of a locomotive, of a heating-box interposed between said smoke-box and smoke-stack and provided with the central exit conduit or passage, the series of vertical pipes arranged within said smoke-stack and communicating with the interior of said heating-box, the supplemental heating-box sustained within the smoke-stack and uniting the series of vertical pipes, the air-feeding pipe or pipes communicating with the interior of said supplemental box, and the distributing pipe or pipes communicating with the interior of said interposed heating-box, substantially as described.

3. The combination, with the furnace structure, the boiler, the smoke-box, and the smoke-stack of a locomotive, of a saddle-shaped heating-box interposed between said smoke-box and smoke-stack, its bottom sunk into the former and provided with the central exit conduit or passage, the series of vertical pipes arranged within said smoke-stack and communicating with the interior of said heating-box, the air-feeding pipe or pipes communicating with said vertical pipes, and the distributing pipe or pipes communicating with the interior of said heating-box, substantially as described.

4. The combination, with the furnace structure, the boiler, the smoke-box, and the smoke-stack of a locomotive, of a heating-box interposed between said smoke-box and smoke-stack, having its bottom sunk into the former and provided with the central exit conduit or passage, the series of vertical pipes arranged within said smoke-stack and communicating with the interior of said heating-box, the supplemental heating-box sustained within the smoke-stack and uniting the series of vertical pipes, the air-feeding pipe or pipes communicating with the interior of said supplemental box, and the distributing pipe or pipes communicating with the interior of said interposed heating-box, substantially as described.

5. An air receiving and conducting flue provided with a longitudinal partition in the interior thereof to form a supplemental chamber, and with the discharge-opening $j$ communicating with said chamber, both ends of the latter being furnished with suitable regulating-valves adapted to operate independently of the main passage or chamber, substantially as described.

6. An air receiving and conducting flue consisting of the combination of the casing provided with the longitudinal partition therein and with the discharge-openings $j$, the valves pivoted at the ends of said partition so as to control the passage of air to said discharge-openings, the hand-wheel, its shaft, and the bevel-gears for operating said valve, substantially as described.

7. An air receiving and conducting flue consisting of the combination of the casing provided with the longitudinal partition therein and with the discharge openings $j$, the valves pivoted at the open ends of said partition so as to control the passage of air to said discharge openings, the hand-wheel, its shaft, and the bevel-gears for operating said valve, together with the index and the graduated segment, substantially as described.

8. An air heating and conducting flue consisting of the combination of the casing provided with the longitudinal partition therein and with the discharge-openings $j$, the said partition having its ends inclined inwardly and provided with the admission-openings, the correspondingly-inclined valves pivoted with close relation to said openings, and means for operating said valves, substantially as described.

9. An air receiving and conducting flue consisting of the combination of the casing provided with the longitudinal partition therein and with the discharge-openings $j$, the valves pivoted with close relation to the open ends of said partition, so as to control the passage of air to said discharge-openings, and the valves $j^3$, pivoted at or near the ends of the conduit, substantially as described.

In testimony whereof we have hereunto affixed our signatures this 17th day of December, A. D. 1889.

CHARLES A. SPRING.
DAVID SPRINGER.
HENRY T. SPRING.
ROBERT STEEL.

Witnesses:
J. E. SNYDER,
J. M. LEWIN.